United States Patent
Lamphere et al.

(10) Patent No.: US 7,204,926 B2
(45) Date of Patent: Apr. 17, 2007

(54) TANDEM BLISK ELECTROCHEMICAL MACHINING

(75) Inventors: Michael Scott Lamphere, Hooksett, NH (US); John Scott Graham, Bedford, NH (US); Richard Spicer Robertson, Bow, NH (US)

(73) Assignee: General Electric Company, Schenectady, NY (US)

( * ) Notice: Subject to any disclaimer, the term of this patent is extended or adjusted under 35 U.S.C. 154(b) by 872 days.

(21) Appl. No.: 09/994,342

(22) Filed: Nov. 26, 2001

(65) Prior Publication Data

US 2006/0272957 A1 Dec. 7, 2006

(51) Int. Cl.
*C25F 7/00* (2006.01)
*C25F 3/02* (2006.01)

(52) U.S. Cl. .............. 205/652; 205/653; 205/654; 204/199; 204/224 M; 204/225

(58) Field of Classification Search ........... 204/224 M; 205/640, 646
See application file for complete search history.

(56) References Cited

U.S. PATENT DOCUMENTS

| 3,755,127 A | * | 8/1973 | Tyler et al. | ............ 204/224 M |
| 4,851,090 A | | 7/1989 | Bruns et al. | |
| 5,641,391 A | * | 6/1997 | Hunter et al. | ................. 205/80 |

FOREIGN PATENT DOCUMENTS

EP 0 426 233 A1 5/1991
JP 2-145217 6/1990

* cited by examiner

*Primary Examiner*—H. Wilkins
(74) *Attorney, Agent, or Firm*—Theodore P. Cummings; Francis L. Conte (57) ABSTRACT

A tandem blisk is mounted in a multiaxis electrochemical machine. A first row of blades is electrochemically machined in sequence. A second row of blades is then electrochemically machined in sequence while the blisk is still mounted in the machine. The machine is initially set up for machining both stages without removal of the blisk between the machining sequences.

20 Claims, 4 Drawing Sheets

TANDEM BLISK ELECTROCHEMICAL MACHINING

BACKGROUND OF THE INVENTION

The present invention relates generally to electrochemical machining, and, more specifically, to electrochemical machining of blisks used in gas turbine engines.

In a gas turbine engine, air is pressurized in a multistage axial compressor and mixed with fuel in a combustor for generating hot combustion gases which are discharged through several rows of turbine stages A high pressure turbine powers the compressor, and a low pressure turbine powers a fan in a turbofan configuration for powering an aircraft in flight.

In the fan and compressor, rotor blades extend radially outwardly from a supporting disk for pressurizing the air during operation. The rotor blades commonly include dovetails at their radially inner ends which are mounted in complementary dovetail slots in the perimeter of the supporting disk. In this configuration, the disk and individual blades may be separately manufactured and later assembled together in the engine.

In another configuration, the rotor blades are integrally formed with their supporting disk in a one-piece or unitary assembly typically referred to as a blisk. The blades do not include dovetails, and extend radially outwardly from the supporting disk in a unitary assembly.

The blisk construction enjoys performance advantages in the engine, yet requires special manufacture thereof. Since the blisk includes a full row or complement of rotor blades, damage to any one of the many blades during the manufacturing process must be carefully avoided since the manufacture of even one unacceptable blade renders the entire blisk unacceptable leading to the scrapping thereof at considerable expense in material and manufacturing cost.

Fan blades are a special type of compressor blades and are larger in size for pressurizing a large volume of air for producing propulsion thrust, which bypasses the compressor during operation. The various forms of compressor blades have generally concave pressure sides and generally convex suction sides extending in span from root to tip of the blades and axially between leading and trailing edges.

The blades in a blisk have camber, twist, and suitable solidity selected for maximizing aerodynamic performance thereof. However, high camber, high twist, and high solidity create substantial problems for the manufacture of the blisk either by conventional machining or by electrochemical machining (ECM).

U.S. Pat. No. 4,851,090, assigned to the present assignee, discloses and claims a method and apparatus for electrochemically machining blisk blades. A pair of electrode tools conforming to the desired configurations of the pressure and suction sides of the individual blades are both translated and collectively rotated during ECM as a liquid electrolyte flows between the blade and tools. The blade forms an anode and the tools form cathodes provided with high electrical current for electrochemically machining the blade to the desired final dimensions thereof by surface erosion of the metal.

The blisk is mounted on a spindle which is rotated during operation to index individual blades between the tool pair, with the individual blade also being translated with the spindle for moving inwardly between the electrode tools. In this way, the compound movement of the electrode tools and the blade are used for electrochemical machining the individual blades in sequence for achieving the desired aerodynamic contours thereof, including camber and twist for the full row of blades on the supporting disk.

However, the ECM machine necessarily requires suitable setup. The blisk requires a fixture for mounting it to the machine spindle. The electrode tools must be correspondingly mounted to the supporting rotary head of the machine for independent translation thereof and collective rotation.

The machine is computer controlled using a conventionally developed computer numerical control (CNC) program which is loaded into the machine memory for use in machining the blisk blades in sequence.

In view of the precision requirements for the final blisk dimensions down to about a few mils or even less than one mil, an elaborate setup procedure is required to ensure precise machining of the production blisk. Either the production blisk itself, or a scrap blisk may be used as an initial sample loaded into the machine for machining one or more sample blades thereon. The sample must then be removed from the machine and inspected to accurately determine the dimensions thereof, which are then compared with the desired final dimensions for the blades.

The setup procedure is typically effected with incremental machining of the sample blades to avoid excessive machining thereof which would render the blade out-of-specification, and therefore unacceptable. Accordingly, the setup procedure is normally repeated several times to incrementally machine the sample blades, and correspondingly adjust tool mounting, blisk fixturing, or datum offsets for the CNC program as required to ensure proper alignment of the blisk in the machine, proper alignment of the electrode tools on their supporting head, and proper machining of the individual blisk blades.

When the setup procedure is finally completed, the production blisk may then be mounted in the machine in the same manner as the sample blisk, and without changing the mounting of the electrode tools or alignment of the various components of the machine. The production blisk may then be electrochemically machined blade-by-blade in sequence to the precise tolerances required by the corresponding drawing specifications therefor.

The manufacture of gas turbine engine blisks is made even more complex for tandem blisks. A tandem blisk includes two rows or stages of rotor blades extending radially outwardly from corresponding supporting disks, all of which are integrally joined together in a unitary or one-piece part. The two stages have correspondingly different configurations for the required aerodynamic performance thereof. Accordingly, different electrode tools are required for the different blisk stages, and corresponding setup of the ECM machine is required for machining each of the two stages of the tandem blisk.

The same machine described above has been used to manufacture tandem blisks in this country for many years. The electrode tools are substantially identical to each other for the two stages of the tandem blisk except for the required differences in the cutting surfaces thereof for effecting the different configurations of the two stages.

The machine is set up with one pair of tools for one stage followed by the final machining of that stage. The machine is then re-set up with a second set of electrode tools for the second stage followed by final machining thereof. And, suitable means are used to translate the spindle to align the different stages with the common rotary head. In this way, the same machine may be used in two independent and separate operations for machining the two stages of the tandem blisk.

Since the corresponding setup required for each of the two stages is an elaborate process, the corresponding manufacturing time and costs are correspondingly higher.

Accordingly, it is desired to provide an improved method of electrochemically machining a tandem blisk for reducing manufacturing time and costs.

BRIEF SUMMARY OF THE INVENTION

A tandem blisk is mounted in a multi-axis electrochemical machine. A first row of blades is electrochemically machined in sequence. A second row of blades is then electrochemically machined in sequence while the blisk is still mounted in the machine. The machine is initially set up for machining both stages without removal of the blisk between the machining sequences.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
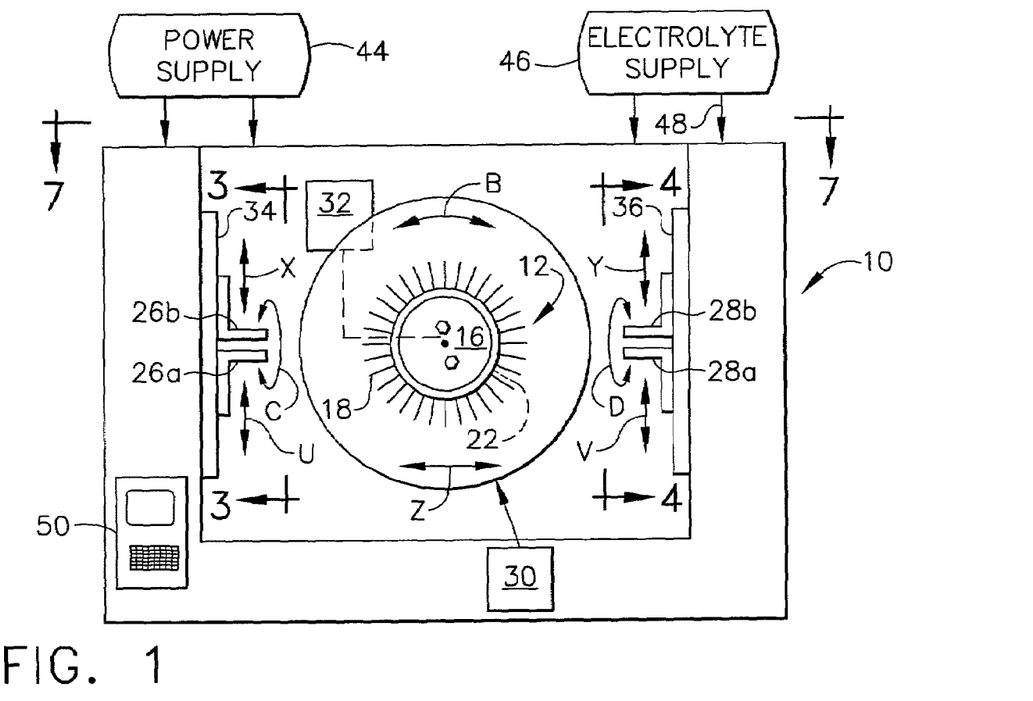
FIG. 1 is an elevational schematic view of an electrochemical machine in accordance with an exemplary embodiment for machining a tandem blisk.

Illustrated in FIG. 1 is a machine or apparatus 10 configured for electrochemically machining (ECM) a tandem blisk 12 in accordance with an exemplary embodiment of the present invention. As additionally shown in FIG. 2, means in the form of a spindle 14 and a fixture 16 are provided for mounting the blisk in the machine.

Figure 2:
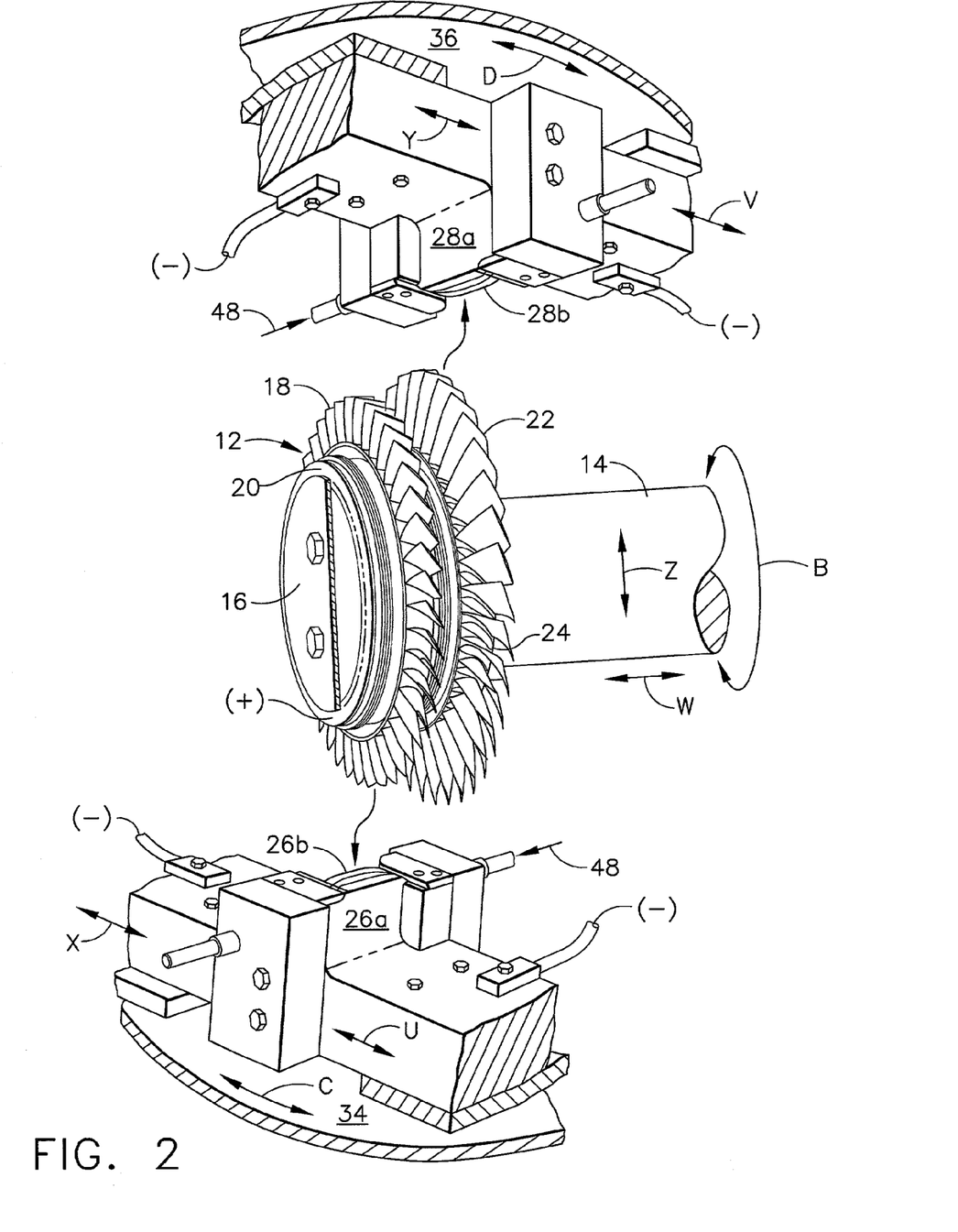
FIG. 2 is an isometric view of first and second machining heads and spindle-mounted tandem blisk illustrated in FIG. 1 in an exemplary embodiment.

The exemplary blisk 12 illustrated in FIG. 2 includes a first row of incipient fan or compressor rotor blades 18 extending radially outwardly from a supporting first rotor disk 20. A second row of incipient fan or compressor rotor blades 22 extends radially outwardly from the perimeter of a supporting second rotor disk 24 in a unitary or one-piece configuration with the first disk and blades.

Each row of blades defines a corresponding stage of the tandem blisk, with each blade stage having a different size and configuration than the other stage as required for the desired aerodynamic performance thereof in a turbofan gas turbine engine for which they are designed. Each blade 18,22 has a generally concave pressure side and an opposite generally convex suction side extending in radial span from root to tip and axially between leading and trailing edges.

The tandem blisk may be initially produced in any conventional manner using a milling machine or another ECM machine for forming the incipient blades 18,22 with suitable oversize dimensions thereof. In this way, the excess material surrounding each blade may be electrochemically machined away to achieve the desired final dimensions of the blades within the precision requirements of the drawing specification with a tolerance down to a few mils, as well as less than a single mil as desired.

The two supporting disks illustrated in FIG. 2 have a common center bore extending therethrough in which the fixture 16 may be mounted for fixedly mounting the tandem blisk to the end of the spindle 14.

Figures 3, 4:
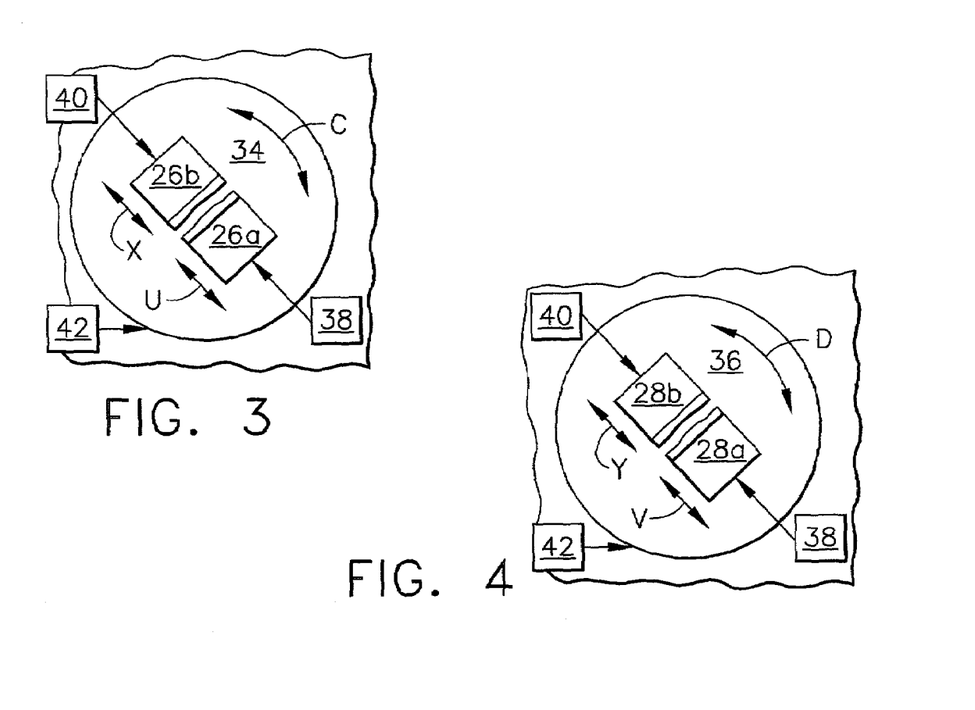
FIG. 3 is an elevational end view of the first machining head and a corresponding first electrode tool pair taken along line 3—3 of FIG. 1.
FIG. 4 is an elevational end view of the second machining head and a corresponding second electrode tool pair taken along line 4—4 of FIG. 1.

As shown in FIGS. 1–3, means in the form of a first pair of electrode tools 26a,b are provided for electrochemically machining in a first sequence the first row of blades 18 in one stage of the blisk mounted in the machine. And, means in the form of a second pair of electrode tools 28a,b as shown in FIGS. 1,2, and 4 are provided for electrochemically machining in sequence the second row of blades 22 in the second stage of the blisk while still mounted in the same machine.

Figure 5:
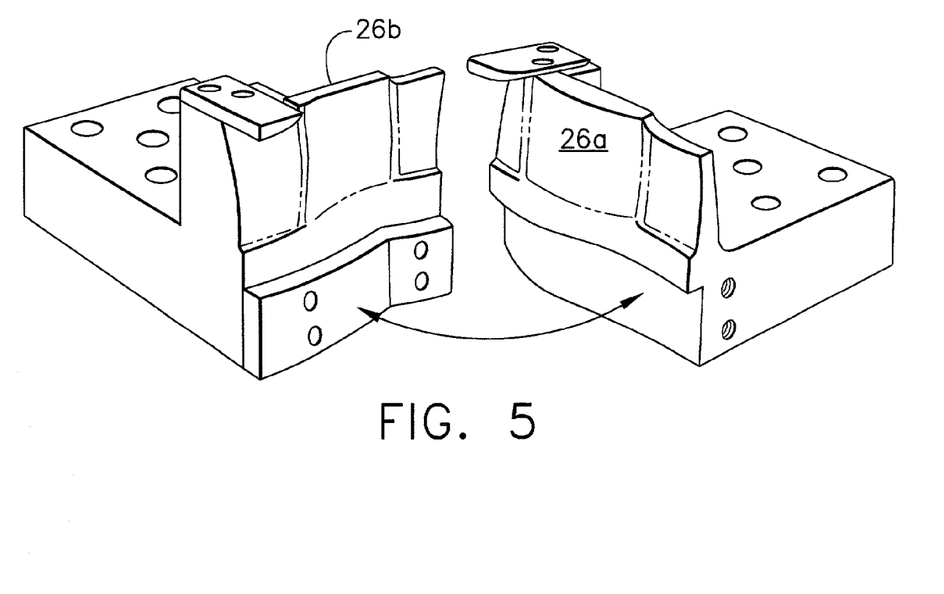
FIG. 5 is an isometric view of the front sides of the first pair of electrode tools illustrated in FIG. 4.
Figure 6:
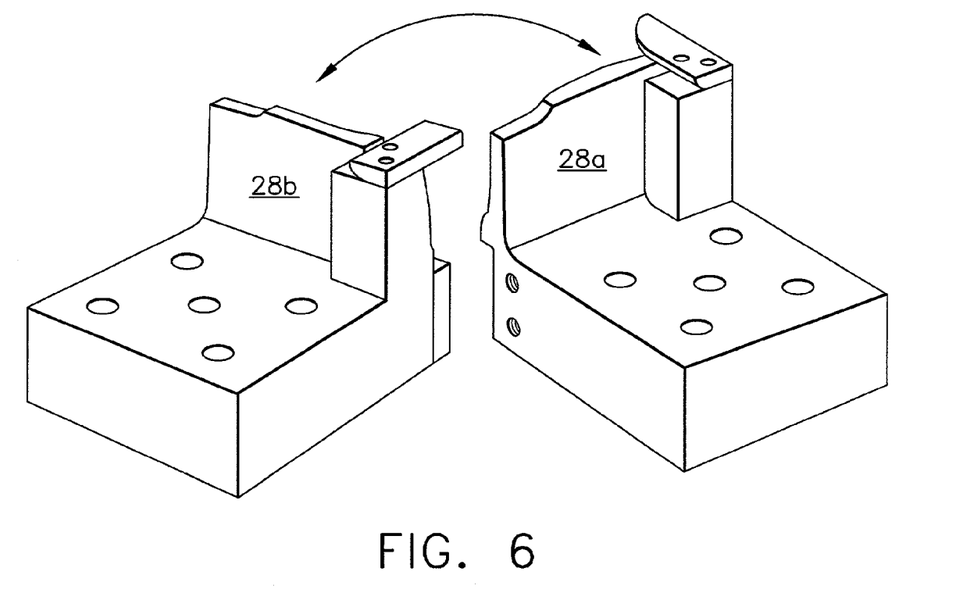
FIG. 6 is an isometric view of the back sides of the second pair of electrode tools illustrated in FIG. 4.

The two sets of electrode tools 26,28, as identified by their prefixes, are correspondingly configured to separately machine the respective first and second blades 18,22 as required to meet the specified dimensions of the drawing specification therefor. As shown in FIGS. 5 and 6, the tools 26,28 may have any conventional configuration such as those disclosed in the US patent identified above with corresponding machining faces for electrochemically machining the opposite sides of the individual blades.

The first tool pair 26 is therefore complementary with the first row blades 18 for machining the opposite pressure and suction sides thereof from root to tip and between the leading and trailing edges. Similarly, the second tool pair 28 is complementary in configuration with the second row blades 22 for machining thereof the opposite pressure and suction sides from root to tip and between the leading and trailing edges.

In order to ECM each blade of the tandem blisk illustrated in FIG. 2, relative motion between each individual blade and the corresponding electrode tool pair is required. Accordingly, means 30 as illustrated schematically in FIG. 1 are provided for moving or translating the blisk in a first direction to the left along the horizontal Z axis into the first pair of tools 26 for ECM in turn each of the first row blades 18. The same moving means 30 are also effective for moving the blisk in a different or opposite second direction to the right in FIG. 1 along the Z axis for ECM in turn each of the second row blades 22.

In order to move the individual blades in proper alignment with the respective tools 26,28, additional means 32 are provided for rotating or indexing the spindle 14 and the blisk 12 attached thereto in the rotary direction B around the longitudinal or axial axis of the spindle. By rotating the spindle, the blisk in turn is rotated to sequentially position the individual blades thereof between the first pair of tools 26 when the spindle is translated to the left in engagement therewith, and between the second pair of tools 28 when the spindle is translated to the right for engagement therewith.

The translating means 30 and the rotating means 32 may have any conventional configuration such as those disclosed in the above-identified patent.

As shown in FIG. 3, the first tool pair 26 are mounted on a first rotary head or turntable 34 suitably disposed vertically in the machine, and FIG. 4 illustrates the second electrode tool pair 28 mounted on a similar second rotary head or turntable 36 which also extends vertically in the machine.

The two turntables or mounting heads 34,36 may be similarly configured to cooperate with the common spindle 14. Each turntable includes means 38 for translating corresponding ones of the tools 26a,28a along corresponding linear axes U, V as illustrated in FIGS. 3 and 4. Each turntable also includes means 40 for translating the opposite or cooperating electrode tool 26b,28b along corresponding linear axes X, Y. And, each turntable 34,36 is mounted in the machine with means 42 for rotating the respective turntables and tool pairs 26,28 thereon in corresponding rotary directions C,D about rotary axes of the respective turntables extending outwardly between the respective tool pairs thereof.

In this way, each of the two electrode tools 26a,b in FIG. 3 and the two electrode tools 28a,b in FIG. 4 may be independently translated along their respective linear axes U,X and V, Y toward respective ones of the first and second row blades from opposite sides thereof for ECM.

The tool translating means 38,40 and rotating means 42 may have conventional configurations such as those disclosed in the above-identified patent. The first turntable 34 supports the first electrode tools 26 for ECM of the first row of blades 18 in sequence in substantially the same manner as that disclosed in the above-identified patent.

However, the introduction of the second turntable 36 in the same machine then permits independent ECM of the second row of blades 22 using the corresponding second electrode tools 28 by repositioning the common spindle 14 and the same blisk 12 thereon for cooperation with the second tools.

The ECM machine 10 illustrated in FIG. 1 may be otherwise conventional except for the introduction of the second turntable 36 and the second electrode tools 28 thereon, and for the additional movement of the spindle 14. A power supply 44 provides electrical current with sufficiently high amperage between the blisk 12 which forms an anode (+) and the first and second electrode tool pairs 26,28 which form respective cathodes (−).

And, a suitable electrolyte supply 46 is operatively joined to the machine for circulating a liquid electrolyte 48 between the electrode tools and the blades for conducting the current therebetween and effecting electrochemical machining in a conventional manner. The tools are provided with suitable seals for containing and channeling the electrolyte flow therebetween, and the tools and seals therefor may have any conventional configuration.

A particular advantage of the multiaxis ECM machine 10 illustrated in FIG. 1 is the ability to ECM in sequence the first row of blades 18 directly followed in turn by ECM in sequence the second row of blades 22 without the need for removal of the blisk, its fixture, or the electrode tools 26,28 from the machine, and without multiple setup procedures corresponding thereto.

In contrast with the ECM machine of the above-identified patent which requires separate setup prior to ECM of each of the two stages of a tandem blisk, the duplex-head ECM machine 10 disclosed above permits a single setup operation with subsequent ECM of the two stages of the blisk in turn which substantially reduces complexity of the ECM operation, reduces associated manufacturing time therefor, and correspondingly reduces the cost of manufacture for tandem blisks.

Figure 7:
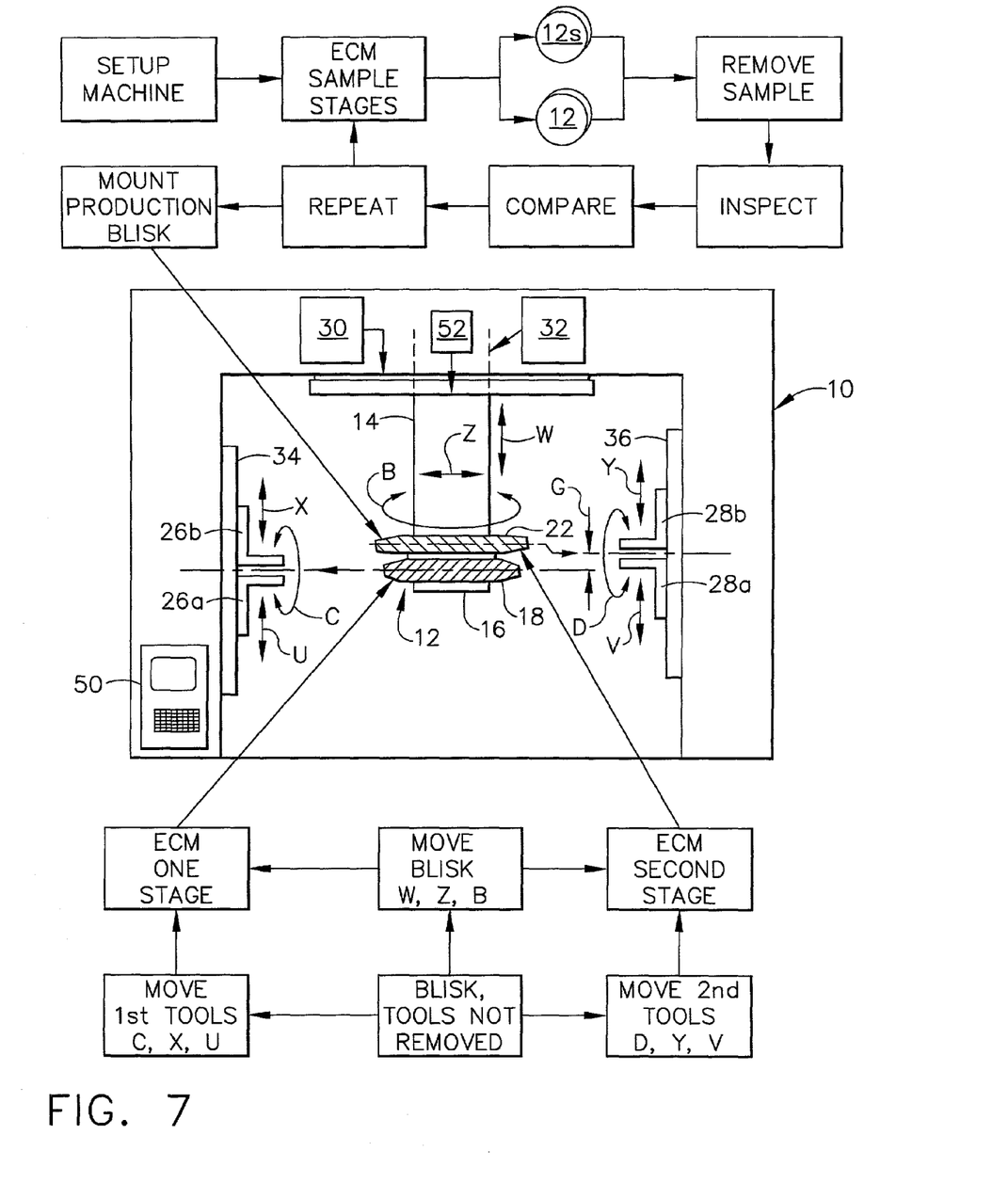
FIG. 7 is a top schematic view of the ECM machine illustrated in FIG. 1 in conjunction with a flowchart of a method of use thereof in accordance with an exemplary embodiment.

More specifically, FIG. 7 illustrates schematically a preferred method for setting up the duplex head ECM machine 10 for machining the tandem blisk 12 in one piece flow or processing therein with a common setup therefor. Setup begins by suitably mounting on the spindle 14 a tandem blisk sample 12s, with corresponding first and second pairs of electrode tools 26,28 specifically configured for the intended production blisk 12.

The machine and its multiple axes of motion is controlled by a conventional controller 50 in the form of a digitally programmable computer in which machine instructions in the form of algorithms or software are stored for ECM of the individual blades of the two blisk stages. The machining software may be loaded separately for ECM of the respective blisk stages, or the software for both stages may be loaded into the machine having suitable memory capacity therefor, and separately run as required.

The blisk sample has two stages of rotor blades corresponding to those of the production blisk, and one or more sample blades in each of the two stages is electrochemically machined to specified dimensions.

The blisk sample 12s is then removed from the machine by dismantling of the fixture 16 atop the spindle 14. The sample blades electrochemically machined in the setup process are then inspected or measured to determine the actual dimensions thereof.

The measured dimensions are then compared with the specified or predetermined dimensions for the production blisk as represented by their drawing specification for determining correspondence therebetween. If the sample blades are within the specified dimensions for the production blisk for both stages, the setup process is completed.

However, the setup process typically requires repeating as necessary the remounting of the sample blisk in the machine and the corresponding setup sequence of electrochemically machining the same or different sample blades, removal of the blisk sample, inspection of the machined blades, and comparison of the inspected dimensions with the specified dimensions for the production blisk.

In this way, the same machine 10, having the same spindle 14 mounting the tandem blisk thereon may be used in a common setup sequence for setting up both machining heads 34,36 for accurately machining the corresponding first and second rows of blades. Accurate mounting of the two sets of electrode tools 26,28 is then ensured, and precise coordination between the movement of the electrode tools and the blisk upon its mounting spindle 14 within the control of the machining software is also ensured.

Initial setup of the duplex head ECM machine may be effected using the production blisk 12 as the same part as the blisk sample 12s carefully removing material from the sample blades in small amounts. Alternatively, the blisk sample 12s may be a different part than the production blisk, such as a previously scrapped blisk having the same configuration.

Upon proper setup using either form of the blisk sample, the production blisk 12 may then be mounted in the machine using the same fixture 16 attached to the spindle 14 in proper alignment thereon. Since the two sets of electrode tools 26,28 remain in tact and without change, the machine may then be operated for electrochemically machining in sequence the first row of rotor blades using the first head 34 and electrodes 26 thereon, followed in turn by machining of the second row of blades 22 using the second head 36 and electrode tools 28 thereon.

The common setup of the two machining heads 34,36 with the same spindle 14 and blisk mounted thereon eliminates the need for removing the blisk between cutting sequences for setting up the respective electrode tools. And there is no need to remove one set of electrode tools for replacement by the second set of electrode tools in subsequent machining since the two heads are provided specifically therefor.

Upon completion of electrochemical machining of both stages of the tandem blisk 12, that blisk may be removed from the spindle 14 and another blisk requiring machining may be remounted on the spindle. Since the two sets of electrode tools have already been set up for a specific tandem blisk, the second blisk may then be machined in an identical sequence for each of the two stages thereof. Two or more tandem blisks may be machined in a corresponding batch for a given blisk configuration without the need for any additional setup of the electrode tools therefor.

Once set up, the duplex-head ECM machine is effective for electrochemically machining the tandem blisk 12 in a first sequence machining the first row of blades 20 in one stage of the blisk followed in direct turn by machining in a second sequence the second row of blades 22 in another stage of the blisk using the corresponding electrode tool pairs 26,28. This simple process is effected without removing the blisk from the machine between the two sequences, and without re-setting up the electrode tools between the two sequences.

As shown in FIG. 1, the rotary centerlines of the two turntables 34,36 are preferably oriented in a common horizontal plane with that of the axial centerline axis of the spindle mounting the blisk 12 thereon. In this way, the radial axis of each blade may be oriented generally horizontally between the machining surfaces of the corresponding electrode pairs 26,28 for compound electrochemical machining thereof using the combined four-axis motion X,U,C,Z for the first head 34 and four-axis motion Y,V,D,Z for the second turntable 36.

The machine as so configured provides seven axes of relative movement, with the Z-axis movement being common. First, second, and third axes correspond with the X,U,C motions. Fourth, fifth, and sixth axes correspond with the X,V,D motions. And, the seventh axis corresponds with the common Z translation.

An eighth axis corresponds with the common B rotation of the spindle and blisk about their centerline axes for positioning individual ones of the blades in proper alignment between the corresponding sets of electrode tools 26,28.

The two heads 34,36 illustrated in FIG. 7 may be oriented around the perimeter of the spindle and blisk in any convenient angular orientation. In the preferred embodiment, the two heads 34,36 are diametrically opposite to each other as illustrated in FIGS. 1 and 7, with the respective centerline axes thereof being in a common horizontal plane as illustrated in FIG. 1.

However, in the plan view illustrated in FIG. 7, the rotary axis of the second turntable 36 disposed between the second tool pair 28 is preferably laterally offset by a suitable distance G from the rotary axis of the first turntable 34 disposed between the first tool pair 26 in two different axial planes along the centerline axis of the spindle 14. Each stage of the tandem blisk 12 has a nominal vertical plane extending therethrough, with the two planes thereof being parallel to the corresponding planes containing the respective rotary axes of the two turntables 34,36.

The first set of electrode tools 26 is arranged in alignment with the first stage blades 18, with the respective radial axis of the individual blades being generally coincident with the rotary axis of the first turntable 34 for compound translation and twisting motion therebetween.

Correspondingly, the second stage blades 22 should be similarly aligned with the second set of electrode tools 28 so that the radial axes of the corresponding second stage blades 22 are generally aligned coincident with the rotary axis of the second turntable 36 during electrochemical machining.

The alignment of the second electrode tools 28 may be effected by correspondingly positioning the second turntable 36 in alignment with the second stage blades 22.

However, in order to add versatility to the common machine for machining either single-stage blisks or tandem-stage blisks of various configurations, the rotary axis of the second turntable 36 is laterally offset from the rotary axis of the first turntable 34 by the offset distance G, with the corresponding two sets of electrode tools 26,28 being similarly offset.

Means 52 as illustrated schematically in FIG. 7 are preferably provided for translating the entire spindle 14 along its longitudinal or axial axis to align the first blade row 18 with the first tool pair 26, and to also align the second blade row 22 with the second tool pair 28.

The spindle translating means 52 may have any conventional configuration and, as indicated above, has been used for many years in one form of the ECM machine disclosed in the above-identified patent. This additional W-axis movement has been used in the conventional ECM machine for aligning the second stage of a tandem blisk with the single turntable mounting the corresponding set of electrode tools in conventional practice. However, those tools must be removed and replaced by different tools for ECM of the second stage of the tandem blisk which requires the multiple setup procedures described above.

The introduction of the spindle translating means 52 in the duplex-head ECM machine 10 of the present invention adds a ninth axis of movement. Offsetting the heads 34,36 minimizes the axial throw or stroke requirement of the translating means 52. The combination of lateral offset G and spindle translation W reduces the overall complexity of the introduction of the second turntable 36 and electrode tools mounted thereon.

The ECM machine disclosed in the above-identified patent enjoys many advantages in the machining of single-stage and tandem-stage blisks. By introducing the second machining head 36 and modifying the Z axis stroke of the previous machine to position the tandem blisk in one direction to cooperate with the first cutting head 34 and in the opposite direction to cooperate with the second head 36, efficiencies of construction, function, and performance for electrochemical machining of tandem blisks is obtained. This offers substantial improvements over the use of the previous machine differently operated for machining tandem blisks with two setup operations and two machining operations.

The second cutting head 36 is preferably laterally offset from the first cutting head 34 to improve the cooperation with the common spindle and the tandem blisk mounted thereon. Initial setup of both cutting heads and their corresponding electrode tool pairs for the common tandem blisk permits sequential electrochemical machining of both stages of blades without interruption, without removal of the tandem blisk between cutting sequences, and without the need for repeating the setup operation of the electrode tools themselves for accurate electrochemical machining. Both stages of the tandem blisk may then be electrochemically machined to final dimensions within tolerances of a few mils or less in a substantially continuous machining operation from blade-to-blade and from stage-to-stage.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which we claim.

We claim:

1. A method for electrochemically machining a tandem blisk comprising:
mounting said blisk in a multiaxis electrochemical machine;
electrochemically machining in a first sequence a first row of blades in one stage of said blisk while mounted in said machine; and
electrochemically machining in a second sequence a second row of blades in another stage of said blisk while still mounted in said machine.

2. A method according to claim 1 further comprising:
moving said blisk in a first direction into a first pair of electrode tools for electrochemical machining each of said first row blades; and
moving said blisk in a different second direction into a second pair of electrode tools for electrochemical machining each of said second row blades.

3. A method according to claim 2 further comprising setting up said machine for machining said blisk by:
electrochemically machining in said machine sample blades in two stages of a tandem blisk sample;
removing said blisk sample from said machine;
inspecting said sample blades in said two stages of said blisk sample to determine dimensions thereof;
comparing said inspected dimensions with specified dimensions for said blisk;
repeating as necessary said setup sequence for said blisk sample until said inspected dimensions are within said specified dimensions; and
then mounting said blisk in said machine for sequentially machining said first and second rows of blades to said specified dimensions.

4. A method according to claim 3 further comprising:
offsetting said second tool pair from said first tool pair in two different planes relative to said blisk; and
translating said blisk between said two offset planes for correspondingly electrochemically machining said first and second blade rows.

5. A method according to claim 3 further comprising:
translating each of said electrode tools in said first tool pair toward a respective one of said first row blades for electrochemical machining thereof; and
translating each of said electrode tools in said second tool pair toward a respective one of said second row blades without removing said blisk and tools from said machine.

6. A method according to claim 5 further comprising:
rotating said first tool pair as said blisk is moved in said first direction during electrochemical machining of each of said first row blades; and
rotating said second tool pair as said blisk is moved in said second direction during electrochemical machining of each of said second row blades.

7. A method according to claim 6 wherein:
said second row blades have different size and configuration than said first row blades;
said first tool pair are complementary with said first row blades for electrochemical machining thereof;
said second tool pair are complementary with said second row blades for electrochemical machining thereof; and
said second tool pair are translated and rotated upon translation of said blisk in said second direction in a manner corresponding with translation and rotation of said first tool pair as said blisk is translated in said first direction.

8. A method according to claim 7 further comprising:
offsetting said second tool pair from said first tool pair in two different planes relative to said blisk; and
translating said blisk between said two offset planes for correspondingly electrochemically machining said first and second blade rows.

9. A method according to claim 8 wherein said blisk sample is the same as said tandem blisk.

10. A method according to claim 8 wherein said blisk sample is a different part than said tandem blisk.

11. A machine for electrochemically machining a tandem blisk comprising:
means for mounting said blisk;
means for electrochemically machining in a first sequence a first row of blades in one stage of said blisk while mounted in said machine; and
means for electrochemically machining in a second sequence a second row of blades in another stage of said blisk while still mounted in said machine.

12. A machine according to claim 11 further comprising:
means moving said blisk in a first direction into a first pair of electrode tools for electrochemical machining each of said first row blades; and
said moving means being configured for additionally moving said blisk in a different second direction into a second pair of electrode tools for electrochemical machining each of said second row blades.

13. A machine according to claim 12 wherein:
said second tool pair is offset from said first tool pair in two different planes relative to said blisk; and
further comprising means for translating said blisk between said two offset planes for correspondingly electrochemically machining said first and second blade rows.

14. A machine according to claim 13 further comprising:
means for translating each of said electrode tools in said first tool pair toward a respective one of said first row blades for electrochemical machining thereof; and
means for translating each of said electrode tools in said second tool pair toward a respective one of said second row blades without removing said blisk and tools from said machine.

15. A machine according to claim 14 further comprising:
means for rotating said first tool pair as said blisk is moved in said first direction during electrochemical machining of each of said first row blades; and
means for rotating said second tool pair as said blisk is moved in said second direction during electrochemical machining of each of said second row blades.

16. A machine according to claim 15 wherein:
said second row blades have different size and configuration than said first row blades;
said first tool pair is complementary with said first row blades for electrochemical machining thereof;
said second tool pair is complementary with said second row blades for electrochemical machining thereof; and
said second tool pair is translatable and rotatable upon translation of said blisk in said second direction in a manner corresponding with translation and rotation of said first tool pair as said blisk is translated in said first direction.

17. A method of setting up said machine according to claim 12 comprising:

electrochemically machining in said machine sample blades in two stages of a tandem blisk sample;

removing said blisk sample from said machine;

inspecting said sample blades in said two stages of said blisk sample to determine dimensions thereof;

comparing said inspected dimensions with specified dimensions for said blisk;

repeating as necessary said setup sequence for said blisk sample until said inspected dimensions are within said specified dimensions; and then mounting said blisk in said machine for sequentially machining said first and second rows of blades to said specified dimensions.

18. A multiaxis machine for electrochemically machining a tandem blisk comprising:

means for mounting said blisk;

a first pair of electrode tools for electrochemically machining in sequence a first row of blades in one stage of said blisk;

means for translating each of said tools in said first tool pair in corresponding first and second axes, and rotating said first tool pair in a third axis;

a second pair of electrode tools for electrochemically machining in sequence a second row of blades in another stage of said blisk;

means for translating each of said tools in said second tool pair in corresponding fourth and fifth axes, and rotating said second tool pair in a sixth axis; and means for translating said blisk along a seventh axis in a first direction into said first tool pair for electrochemically machining each of said first row blades, and in an opposite second direction into said second tool pair for electrochemically machining each of said row blades.

19. A machine according to claim 18 further comprising;

means for rotating said blisk to sequentially position said blades thereof between said first pair of tools for electrochemical machining thereof, and between said second pair of tools for electrochemical machining thereof; and means for translating said blisk along a longitudinal axis thereof to align said first blade row with said first tool pair, and to align said second blade row with said second tool pair.

20. A method for electrochemically machining a tandem blisk in a single multiaxis machine comprising electrochemically machining in a first sequence a first row of blades in one stage of said blisk followed in turn by electrochemically machining in a second sequence a second row of blades in another stage of said blisk using corresponding electrode tools without removing said blisk from said machine between said two sequences, and without re-setting up said tools between said two sequences.

* * * * *